(12) United States Patent
Strope et al.

(10) Patent No.: US 11,072,133 B1
(45) Date of Patent: Jul. 27, 2021

(54) DATA-DRIVEN DECISIONS FOR IMPROVED COMPOSITE MANUFACTURING

(71) Applicant: THE BOEING COMPANY, Chicago, IL (US)

(72) Inventors: Russell A. Strope, Mt. Pleasant, SC (US); Gary E. Georgeson, Tacoma, WA (US); Seeran Prajapati, Summerville, SC (US); Sadie L. Fieni, Ladson, SC (US); John W. Adams, North Charleston, SC (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/787,763

(22) Filed: Feb. 11, 2020

(51) Int. Cl.
*B29C 70/54* (2006.01)
*B29C 70/30* (2006.01)
*G05B 23/02* (2006.01)
*G05B 19/4063* (2006.01)

(52) U.S. Cl.
CPC .............. *B29C 70/54* (2013.01); *B29C 70/30* (2013.01); *G05B 19/4063* (2013.01); *G05B 23/0275* (2013.01)

(58) Field of Classification Search
None
See application file for complete search history.

(56) References Cited

U.S. PATENT DOCUMENTS 8,285,414 B2 * 10/2012 Aharoni ............. G05B 23/0229
700/175

OTHER PUBLICATIONS

Steffes et al., "Aircraft Management and Sustainment Using NDI Data Trending and Mapping Technologies", Air Force Research Laboratory, 2012, pp. 1-25.
Ashton, "NLign Analytics Introduction", NLign Analytics, 2012, pp. 1-16.

* cited by examiner

*Primary Examiner* — Carlos R Ortiz Rodriguez
(74) *Attorney, Agent, or Firm* — Womble Bond Dickinson (US) LLP

(57) ABSTRACT

A method is provided that includes monitoring a process of manufacturing a composite structure that includes introducing a matrix material to a reinforcement material, applying the reinforcement material into a mold cavity or onto a mold surface with a first machine tool, subjecting the matrix material to a melding event with a second machine tool, and inspecting the composite structure. Data including at least one of first measurement data, error data or second measurement data is determined, and an analysis of the data is performed to summarize the data and thereby produce feedback data including a summary of the data. At least one of the process, the first machine tool or the second machine tool is adjusted based on feedback including the summary, and for manufacture of a next composite structure.

20 Claims, 6 Drawing Sheets

DATA-DRIVEN DECISIONS FOR IMPROVED COMPOSITE MANUFACTURING

TECHNOLOGICAL FIELD

The present disclosure relates generally to composite manufacturing and, in particular, to using data analytics for improved composite manufacturing.

BACKGROUND

Aircraft are being designed and manufactured with greater and greater percentages of composite materials. Some aircraft may have more than fifty percent of their primary structure made from composite materials. Composite materials are used in aircraft to decrease the weight of the aircraft. This decreased weight improves performance features, such as payload capacities and fuel efficiencies. Further, composite materials provide longer service life for various components in an aircraft.

Composite materials are tough, light-weight materials, created by combining two or more dissimilar components. For example, a composite may include components such as a reinforcement material (e.g., fibers) and matrix material (e.g., resin) that are combined and cured to form a composite material.

By using composite materials, portions of an aircraft may be created in larger pieces or sections. This is called integrated structure. For example, a fuselage in an aircraft may be created in cylindrical sections that may be put together to form the fuselage of the aircraft. Other examples include, for example, without limitation, wing skins, span-wise stiffeners, spars and chordwise ribs joined to form a wing, stabilizer sections joined to form a stabilizer, a stiffener, a fairing, a control surface, a skin, a skin section, a door, a strut, and a tubular structure.

In manufacturing composite components, the materials are typically formed using a mold with sufficient rigidity to maintain the desired shape for the composite component when the composite materials are applied into a cavity of the mold cavity or onto a surface of the mold. A mold may be metallic or non-metallic in composition to provide rigidity for supporting the composite materials.

Currently, many composites in a manufactured aircraft employ an autoclave to cure the composite components. Resins in pre-impregnated plies of fibers typically need an elevated temperature to achieve a chemical reaction that allows these resins to flow and cure, and an elevated pressure to achieve ply consolidation and expel gases contained within the pre-impregnated plies, known as porosity. With large components, a large autoclave is used to encompass the component and the tool for processing.

Conventional composite manufacturing processes are subject to undesirable errors and inconsistency, which may in turn result in reduced yield, increased scrap and rework, or performance/weight penalties resulting from reduced design allowables (structural knockdowns).

BRIEF SUMMARY

Example implementations of the present disclosure relate generally to composite manufacturing and, in particular, to using data analytics for improved composite manufacturing. In accordance with example implementations, data recorded or reported during manufacturing is collected, and an analysis of the data is performed to summarize the data and thereby produce a summary of the data. Feedback including the summary may suggest or otherwise indicate one or more adjustments enhance the process or machine tools, reduce undesirable errors and inconsistency, or otherwise improve the process, machine tools or composite structures that are manufactured. The process or a machine tool used in the process may then be adjusted based on feedback including the summary, and a next composite structure is manufactured according to or using the process or machine tool, as adjusted.

The present disclosure thus includes, without limitation, the following example implementations.

Some example implementations provide a method comprising monitoring a process of manufacturing a composite structure that comprises: introducing a matrix material to a reinforcement material; applying the reinforcement material into a mold cavity or onto a mold surface with a first machine tool; subjecting the composite structure, including the reinforcement material and the matrix material, to a melding event with a second machine tool, to set the composite structure including the reinforcement material and the matrix material; and inspecting the composite structure to evaluate properties of the composite structure; and based on the monitoring, determining data comprising at least one of first measurement data indicative of an operating condition of at least one of the first machine tool or the second machine tool, error data indicative of an error associated with at least one of the first machine tool or the second machine tool, or second measurement data indicative of a property of the composite structure; performing an analysis of the data to summarize the data and thereby produce feedback data comprising a summary of the data; and adjusting at least one of the process, the first machine tool or the second machine tool based on the feedback data, and for manufacture of a next composite structure.

In some example implementations of the method of any preceding example implementation, or any combination of any preceding example implementations, performing the analysis comprises performing the analysis to produce the feedback data comprising the summary of the data from which an outlier, trend or pattern in the data is identifiable, and wherein adjusting at least one of the process, the first machine tool or the second machine tool comprises identifying an adjustment based on the outlier, trend or pattern, and adjusting at least one of the process, the first machine tool or the second machine tool according to the adjustment.

In some example implementations of the method of any preceding example implementation, or any combination of any preceding example implementations, performing the analysis comprises automatically producing infographics in a graphical user interface (GUI) to visually summarize the data.

In some example implementations of the method of any preceding example implementation, or any combination of any preceding example implementations, when at least one of the first machine tool or the second machine tool experiences a fault during manufacture of the composite structure, the data comprises the first measurement data, including measurements of a particular operating condition of at least one of the first machine tool or the second machine tool before the fault, wherein performing the analysis comprises performing the analysis to summarize a change in the measurements of the particular operating condition before the fault, and wherein adjusting at least one of the process, the first machine tool or the second machine tool comprises performing a repair or replacement of at least one of the first machine tool or the second machine tool that experienced the fault, and adjusting the process to further monitor the particular operating condition during manufacture of the next composite structure.

In some example implementations of the method of any preceding example implementation, or any combination of any preceding example implementations, the data comprises the error data, including a particular error repeatedly reported during manufacture of the composite structure, wherein performing the analysis comprises performing the analysis to summarize repetition of the particular error, and wherein adjusting at least one of the process, the first machine tool or the second machine tool comprises performing a root cause analysis to identify a root cause of the repetition of the particular error, and adjusting at least one of the first machine tool or the second machine tool to address the root cause.

In some example implementations of the method of any preceding example implementation, or any combination of any preceding example implementations, the data comprises the second measurement data, including particular measurements of a property of the composite structure spatially referenced to locations on the composite structure, and wherein performing the analysis further comprises generating a three-dimensional (3D) model of the composite structure with the particular measurements indicated on the 3D model at the locations to which the particular measurements are spatially referenced.

In some example implementations of the method of any preceding example implementation, or any combination of any preceding example implementations, the particular measurements include measurements of cure state of the composite structure referenced to locations on the composite structure.

In some example implementations of the method of any preceding example implementation, or any combination of any preceding example implementations, the particular measurements include measurements of wrinkles or defects identified on the composite structure.

In some example implementations of the method of any preceding example implementation, or any combination of any preceding example implementations, the particular measurements include measurements of defects in the composite structure, classified in a plurality of subclasses of defects, and wherein generating the 3D model comprises generating a heat map including the 3D model on which the subclasses of defects are indicated, spatially referenced to locations on the composite structure.

In some example implementations of the method of any preceding example implementation, or any combination of any preceding example implementations, the particular measurements include measurements that are out of tolerance or non-conforming, and wherein generating the 3D model comprises generating a heat map including the 3D model on which numbers of the measurements that are out of tolerance or non-conforming are indicated, spatially referenced to locations on the composite structure.

Some example implementations provide a computer comprising a memory configured to store computer-readable program code; and processing circuitry configured to access the memory, and execute the computer-readable program code to cause the computer to at least: monitor a process of manufacturing a composite structure that comprises machine tools configured to at least: introduce a matrix material to a reinforcement material; apply the reinforcement material into a mold cavity or onto a mold surface with a first machine tool of the machine tools; subject the composite structure, including the reinforcement material and the matrix material, to a melding event with a second machine tool of the machine tools, to set the composite structure; and inspect the composite structure to evaluate properties of the composite structure; and based on the monitor, determine data comprising at least one of first measurement data indicative of an operating condition of at least one of the first machine tool or the second machine tool, error data indicative of an error associated with at least one of the first machine tool or the second machine tool, or second measurement data indicative of a property of the composite structure; and perform an analysis of the data to summarize the data and thereby produce feedback data comprising a summary of the data, wherein at least one of the process, the first machine tool or the second machine tool is adjustable based on the feedback data, and for manufacture of a next composite structure.

In some example implementations of the computer of any preceding example implementation, or any combination of any preceding example implementations, the computer caused to perform the analysis comprises the computer caused to perform the analysis to produce the feedback data comprising the summary of the data from which an outlier, trend or pattern in the data is identifiable, and identify an adjustment based on the outlier, trend or pattern, and wherein at least one of the process, the first machine tool or the second machine tool is adjustable according to the adjustment.

In some example implementations of the computer of any preceding example implementation, or any combination of any preceding example implementations, the computer caused to perform the analysis comprises the computer caused to automatically produce infographics in a graphical user interface (GUI) to visually summarize the data. In some example implementations of the computer of any preceding example implementation, or any combination of any preceding example implementations, when at least one of the first machine tool or the second machine tool experiences a fault during manufacture of the composite structure, the data comprises the first measurement data, including measurements of a particular operating condition of at least one of the first machine tool or the second machine tool before the fault, wherein the computer caused to perform the analysis comprises the computer caused to perform the analysis to summarize a change in the measurements of the particular operating condition before the fault, and wherein at least one of the first machine tool or the second machine tool that experienced the fault is repairable or replaceable, and the process is adjustable to further monitor the particular operating condition during manufacture of the next composite structure.

In some example implementations of the computer of any preceding example implementation, or any combination of any preceding example implementations, the data comprises the error data, including a particular error repeatedly reported during manufacture of the composite structure, wherein the computer caused to perform the analysis comprises the computer caused to perform the analysis to summarize repetition of the particular error, and wherein the processing circuitry is configured to execute the computer-readable program code to cause the computer to further perform a root cause analysis to identify a root cause of the repetition of the particular error, and at least one of the first machine tool or the second machine tool is adjustable to address the root cause.

In some example implementations of the computer of any preceding example implementation, or any combination of any preceding example implementations, the data comprises the second measurement data, including particular measurements of a property of the composite structure spatially referenced to locations on the composite structure, and wherein the computer caused to perform the analysis further comprises the computer caused to generate a three-dimensional (3D) model of the composite structure with the particular measurements indicated on the 3D model at the locations to which the particular measurements are spatially referenced.

In some example implementations of the computer of any preceding example implementation, or any combination of any preceding example implementations, the particular measurements include measurements of cure state of the composite structure referenced to locations on the composite structure.

In some example implementations of the computer of any preceding example implementation, or any combination of any preceding example implementations, the particular measurements include measurements of wrinkles or defects identified on the composite structure.

In some example implementations of the computer of any preceding example implementation, or any combination of any preceding example implementations, the particular measurements include measurements of defects in the composite structure, classified in a plurality of subclasses of defects, and wherein the computer caused to generate the 3D model comprises the computer caused to generate a heat map including the 3D model on which the subclasses of defects are indicated, spatially referenced to locations on the composite structure.

In some example implementations of the computer of any preceding example implementation, or any combination of any preceding example implementations, the particular measurements include measurements that are out of tolerance or non-conforming, and wherein the computer caused to generate the 3D model comprises the computer caused to generate a heat map including the 3D model on which numbers of the measurements that are out of tolerance or non-conforming are indicated, spatially referenced to locations on the composite structure.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

Figure 4A:
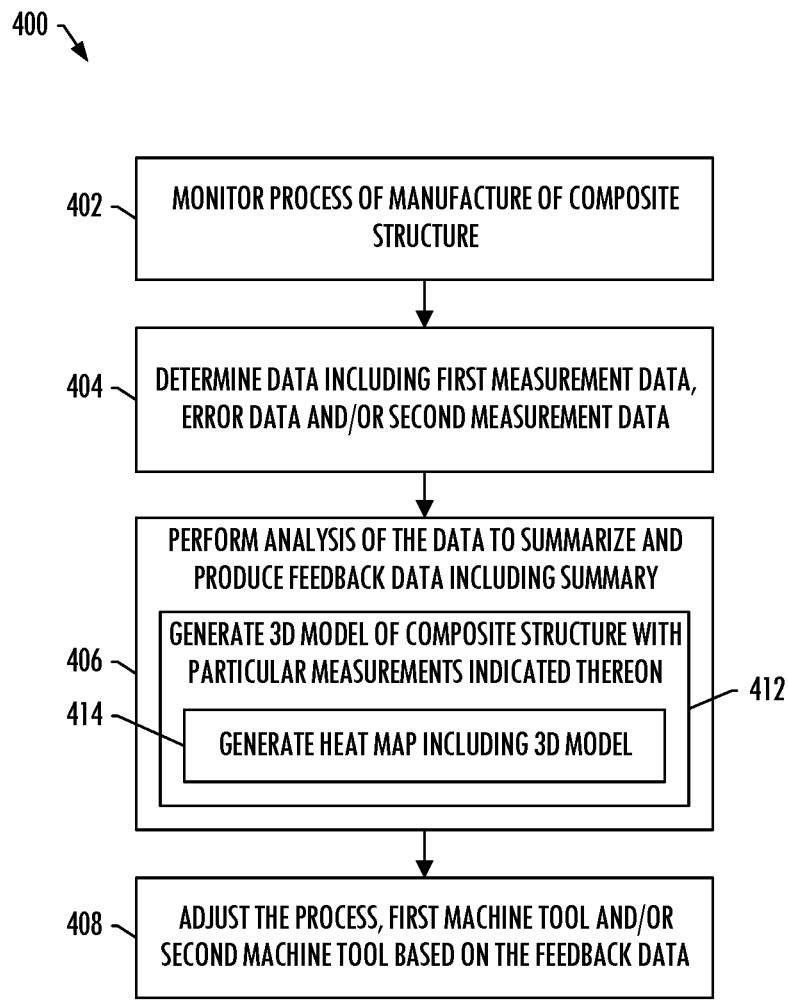
Figure 4B:
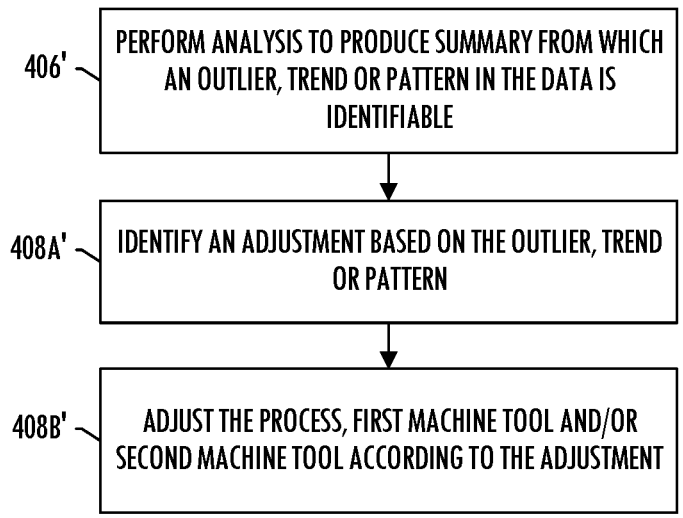
Figure 4C:
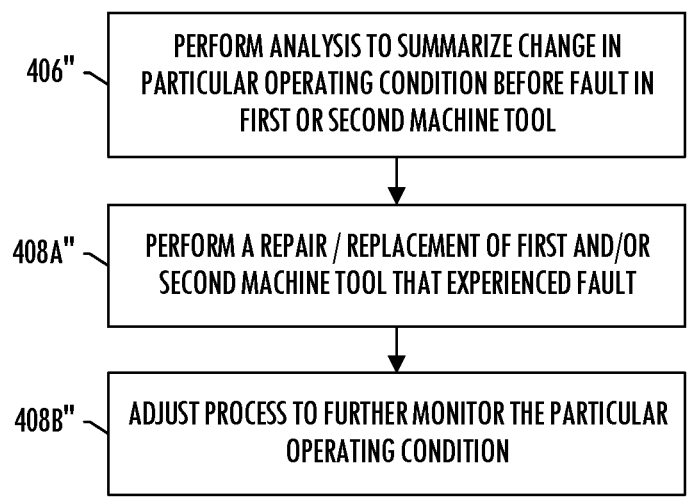
Figure 4D:
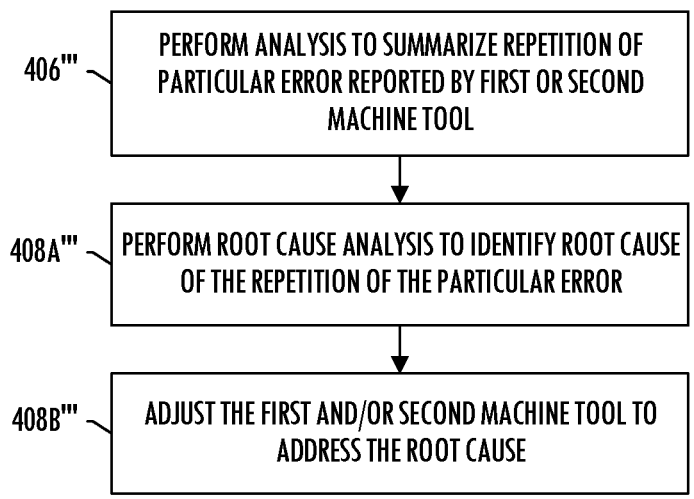
Figure 5:
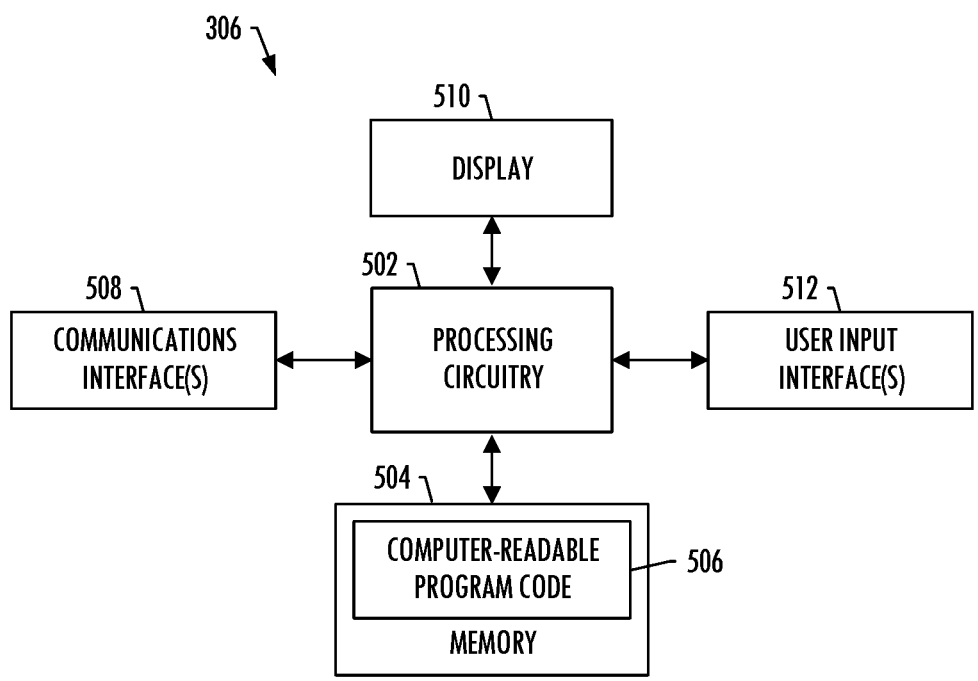

FIGS. 4 A, 4B, 4C and 4D are flowcharts illustrating various operations in a method of manufacturing composite structures, according to various example implementations; and FIG. 5 illustrates a computer according to some example implementations.

DETAILED DESCRIPTION

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless specified otherwise or clear from context, references to first, second or the like should not be construed to imply a particular order. A feature may be described as being above another feature (unless specified otherwise or clear from context) may instead be below, and vice versa; and similarly, features described as being to the left of another feature else may instead be to the right, and vice versa. As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. To the extent that terms "includes," "including," "has," "contains," and variants thereof are used herein, such terms are intended to be inclusive in a manner similar to the term "comprises" as an open transition word without precluding any additional or other elements. Like reference numerals refer to like elements throughout.

Example implementations of the present disclosure relate generally to composite manufacturing and, in particular, to using data analytics for improved composite manufacturing. Example implementations can be applied to pre-impregnated and resin infused plies for any suitable manufacturing process, including, but not limited to, in-autoclave, out-of-autoclave and/or resin infused processes. The structure can be any of a number of different structures composed of one or more layers (more specifically "plies" in some examples), each of which in some examples can include reinforcement material such as a bed of fibers (at times more simply referred to as a ply or a ply of fibers).

The bed of fibers can be pre-impregnated with a matrix material such as resin, or held together with a binder and to be infused with resin. These composite structures can be composed of a plurality of component elements including, for example, one or more plies of fibers each ply of which can be pre-impregnated with resin or held together with a binder (and to be infused with resin). Examples of suitable structures include composites, laminated composites and the like, such as laminated composites of unidirectional tape plies, layered metallic structures, metallic or composite skin and core (sandwich structures) and the like. These structures can be put to use in a number of different manners, such as on manned or unmanned vehicles (e.g., motor vehicles, railed vehicles, watercraft, aircraft, spacecraft, etc.). Furthermore, it should be understood that unless otherwise specified, the terms "data," "content," "digital content," "information," and similar terms may be at times used interchangeably.

Figure 1:
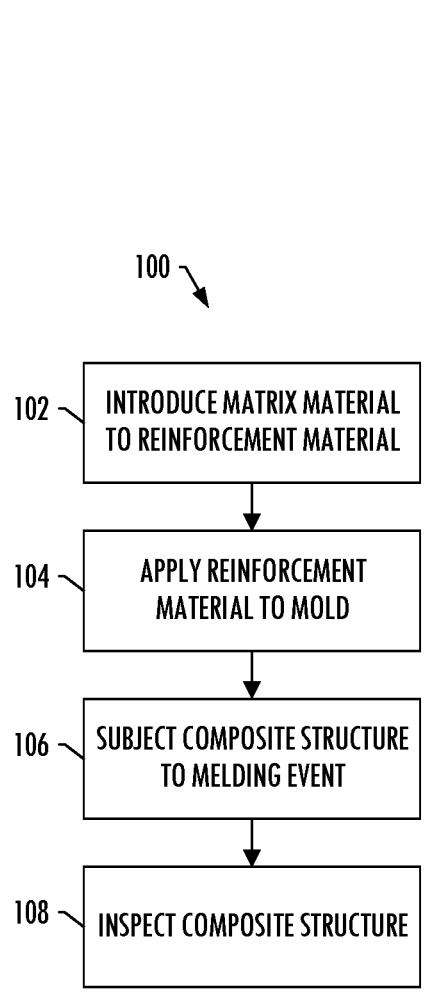
FIGS. 1 and 2 illustrate various operations in methods of manufacturing a composite structure that may benefit from at least some example implementations of the present disclosure.

FIG. 1 illustrates various operations in a process 100 of manufacturing a composite structure that can benefit from at least some example implementations of the present disclosure, although example implementations can be equally applicable to other processes of composite manufacturing. As shown at block 102, the process includes introducing a matrix material such as resin, to a reinforcement material such as a bed of fibers. This can include pre-impregnating the fibers with resin, and forming a tow or tape of the thereby pre-impregnated fibers.

The process 100 includes applying the reinforcement material (e.g., fibers) into a mold cavity or onto a mold surface with a first machine tool, as shown at block 104. In some examples, the reinforcement material is applied onto the mold surface that is a mandrel tool, and the first machine tool is an automated fiber placement (AFP) or automated tape laying (ATL) machine. In these examples, applying the reinforcement material includes applying the tow or tape onto the mandrel tool with the AFP or ATL machine.

As shown at block 106, the process 100 also includes subjecting the composite structure, including the reinforcement material and the matrix material (e.g., resin), to a melding event with a second machine tool such as an autoclave or oven, to set the composite structure. And as shown at block 108, the process includes inspecting the composite structure to evaluate properties of the composite structure. In some examples, inspection of the composite structure can include nondestructive inspection (NDI). Examples of suitable machine tools useful for inspection of the composite structure include various automated ultrasonic inspection systems as well as measurement systems.

Figure 2:
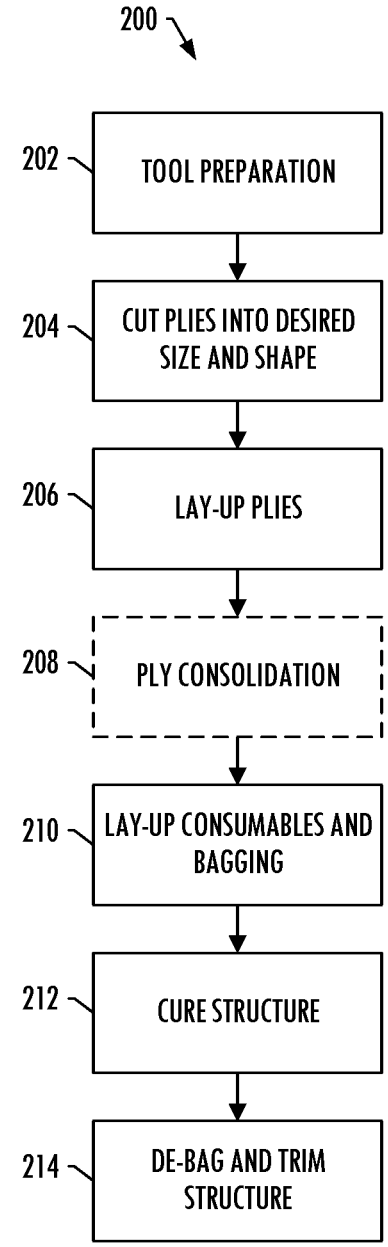

FIG. 2 illustrates more particularly various operations in a process 200 of manufacturing a composite structure that can benefit from at least some example implementations. As shown at block 202, the process can include preparation of a tool (or mold), which can include cleaning and applying a release agent chemical to the tool. One or more plies of fibers can be cut to a desired size and/or shape, and placed onto the tool in their correct order, as shown at blocks 204 and 206. As indicated above, these plies can be pre-impregnated with resin, or held together with a binder and to be infused with resin.

The process 200 can include ply consolidation, as shown at block 208. In the case of pre-impregnated plies, this ply consolidation can include periodic consolidation (debulking) of the plies by sealing the lay-up under a vacuum bag with a layer of permeable material to provide an air path to evacuate volatiles. The debulking can be accomplished by applying full vacuum for a defined period of time (e.g., 5-10 minutes) to consolidate and remove air from the plies.

In the case of resin infusion, ply consolidation is often referred to as pre-forming. This involves laying up the plies, placing the plies under vacuum to form them into the correct shape and taking the plies up to a temperature (e.g., 330° F.) that melts the binder. This sets the plies into the correct shape. In some examples, the plies can be trimmed and then transferred from the pre-forming tooling onto an infusion tool. This pre-forming can more often be performed where the geometry is complex and the plies cannot be adequately laid up in-situ.

For both pre-impregnated plies and those to be infused with resin, the process 200 can include a lay-up consumables and bagging step, as shown at block 210. Here, a layer of release film can be placed over the lay-up as a protective barrier over the plies, and a layer of permeable material can be placed over the release film to create an air path. For pre-impregnated plies, this air path can be to remove gases and volatiles from the plies. For plies to be infused with resin, the air path can create a path to infuse resin into the plies (or more specifically their respective beds of fibers). For both types of plies, the lay-up can be covered in a vacuum bag that is sealed air tight to the tool.

The structure can then be cured, as shown at block 212. For pre-impregnated plies, this can include placing the bagged lay-up in an autoclave. For plies to be infused with resin, this can include placing the bagged lay-up in an oven, and connecting the lay-up to a resin source. Pressure and temperature profiles can be applied according to a recommended cure cycle to cure the resin in the case of pre-impregnated plies, or infuse the plies with resin and cure the resin in the case of plies to be infused. After the cure cycle, the composite structure can be de-bagged and trimmed, as shown at block 214. This can include removal of the tool from the autoclave (for pre-impregnated plies) or oven (for resin infusion), and removal of consumables (vacuum bag, permeable material and release film). The cured composite structure can be de-molded from the tool, and trimmed to remove sharp edges and create a desired final shape, which can then be inspected.

As described above in the process 200 of FIG. 2, impregnating or infusing the plies of fibers with resin can correspond to introducing a matrix material to a reinforcement material, as shown at block 102 in the process 100 of FIG. 1. Preparing the tool (block 202), cutting the plies and placing them onto the tool (blocks 204 and 206), ply consolidation (block 208) and lay-up consumables and bagging (block 210) can correspond to applying the reinforcement material into the mold cavity or onto the mold surface, as shown at block 104 in the process 100 of FIG. 1. And curing the structure (block 212) can correspond to subjecting the matrix material to a melding event, as shown at block 106 in the process 100 of FIG. 1.

Example implementations of the present disclosure provides a system and method for improving composite manufacturing, such as process 100, 200. Example implementations can be applied in-process during manufacture of a composite structure to achieve one or more certain defined quality. Example implementations can be applied before, after or during any of a number of different operations of the process of manufacturing a composite structure, or between the manufacture of a composite structure and manufacture of a next composite structure. In accordance with example implementations, data recorded and/or reported during manufacturing may be determined, and an analysis of the data may be performed to summarize the data and thereby produce feedback data including a summary of the data. The process and/or a machine tool used in the process may be adjusted based on feedback including the summary, and for manufacture of a next composite structure.

Figure 3:
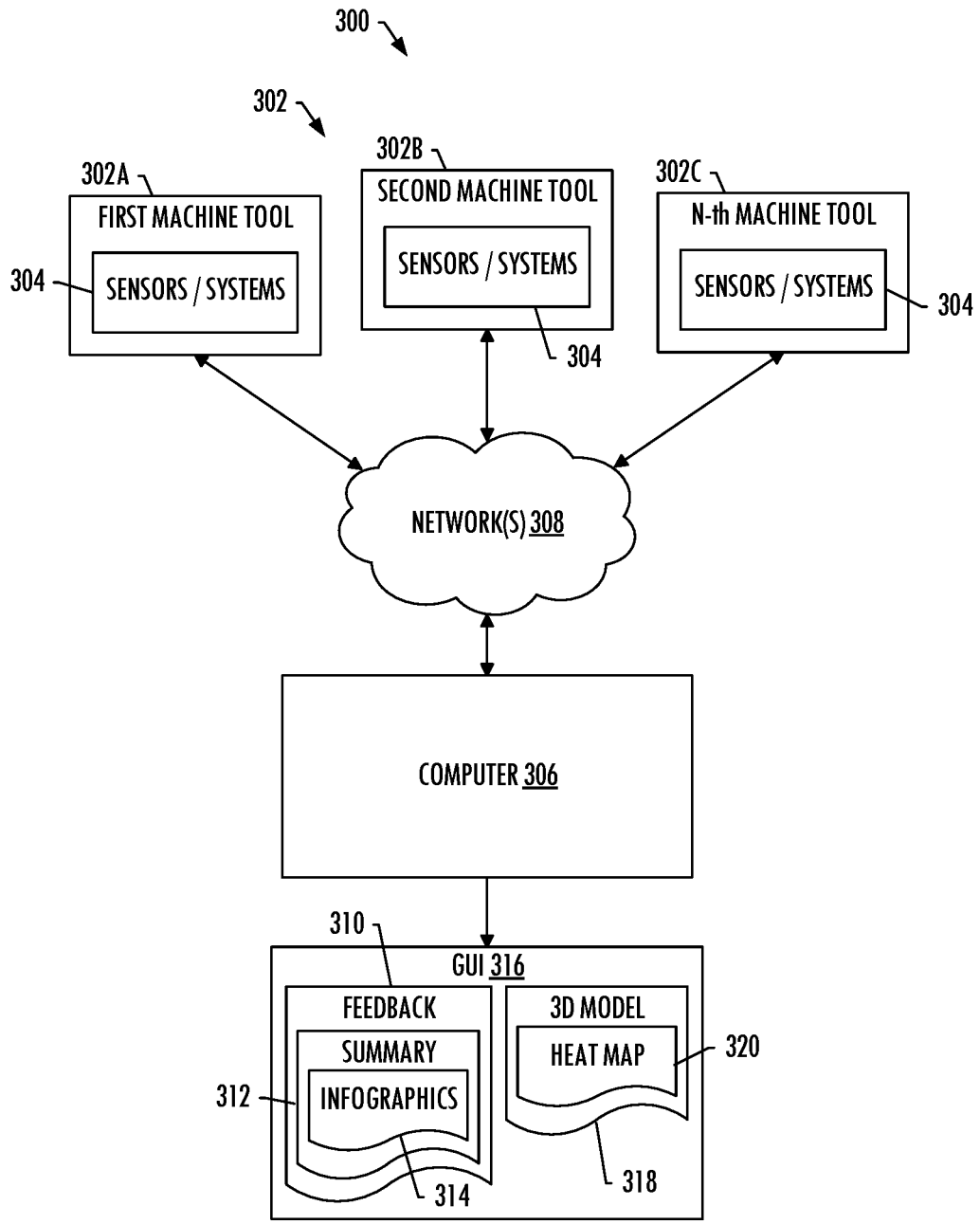
FIG. 3 illustrates a system for manufacturing composite structures, according to some example implementations of the present disclosure.

FIG. 3 illustrates a system 300 for manufacturing composite structures, according to some example implementations. The system can include any of a number of different subsystems (e.g., each an individual system) for performing one or more functions or operations. In some examples, the system includes machine tools 302 configured to manufacture a composite structure of the composite structures. As shown, the machine tools include a first machine tool 302A, second machine tool 302B and an n-th machine tool 302C. As explained above, examples of suitable machine tools include a mold such as a mandrel tool, an automated fiber placement (AFP) machine, an automated tape laying (ATL) machine, an infusion tool, an autoclave, an oven, a trim and drill machine, an automated ultrasonic inspection system, measurement system, and the like.

The machine tools 302 are configured to manufacture the composite structure according to a process such as, but not limited to, processes 100 and/or 200. In this regard, the machine tools are configured to introduce a matrix material to a reinforcement material, and apply the reinforcement material into a mold cavity or onto a mold surface with the first machine tool 302A (e.g., mandrel tool, AFP machine, ATL machine, infusion tool). The machine tools are configured to subject the matrix material to a melding event with a second machine tool 302B (e.g., autoclave, oven) to set the composite structure including the reinforcement material and the matrix material. And the machine tools 302 are configured to inspect the composite structure to evaluate properties of the composite structure.

As also shown, the first machine tool 302A, second machine tool 302B and n-th machine tool 302C include sensors or systems 304 configured to record or report data during manufacture of the composite structure. In some examples, this data includes measurements of operating conditions of the first machine tool and/or the second machine tool. Additionally or alternatively, for example, the data includes errors reported by the first machine tool and/or the second machine tool, recorded and/or reported by sensors or systems of respectively the first machine tool and/or the second machine tool during (and/or after) manufacture of the composite structure. And in some examples, the data can additionally or alternatively include measurements of the properties of the composite structure recorded or reported during (and/or after) manufacture of the composite structure, such as from the inspection of the composite structure.

The system 300 of example implementations of the present disclosure includes a computer 306 configured to monitor the process of manufacturing the composite structure, and determine data including first measurement data, error data and/or second measurement data. The first measurement data may be indicative of at least one operating condition of one or more of the machine tools 302. The error data may be indicative of at least one error associated with one or more for the machine tools, and the second measurement data may be indicative of at least one property of the composite structure. The data can include data for manufacture of the composite structure or over a plurality of composite structures. In some examples, the computer is co-located or directly coupled to one or more of the machine tools. Additionally or alternatively, in some examples, the computer can communicate with one or more of the machine tools across one or more computer networks 308.

The computer 306 is configured to perform an analysis of the data to summarize the data and thereby produce feedback data 310 comprising a summary 312 of the data. In some examples, the computer 306 is configured to automatically produce infographics 314 in a graphical user interface (GUI) 316 to visually summarize the data. Examples of suitable analyses include exploratory data analyses. More particular examples of suitable analyses include univariate analysis, bivariate analysis, outlier detection, correlation analysis, and the like. Examples of suitable infographics include frequency distributions (e.g., histograms, bar plots, kernel density estimation plots), descriptive statistics (e.g., box plots, flight phase levels), data quality graphics (e.g., table plots, summaries of distinct count), correlations (e.g., heat maps), time-series plots, and the like.

According to example implementations of the present disclosure, the feedback data 310 including the summary 312 can suggest or otherwise indicate one or more adjustments to enhance the process or machine tools 302, reduce undesirable errors and inconsistency, or otherwise improve the process, machine tools or composite structures that are manufactured. This can include an adjustment to the process according to which the composite structure is manufactured. Additionally or alternatively, the adjustments can include an adjustment to one or more of the machine tools (e.g., first machine tool 302A, second machine tool 302B, n-th machine tool 302C). These adjustments can be made, and the next and any subsequent composite structures manufactured.

In some examples, the computer 306 may be configured to determine one or more adjustments either automatically, under direct operator control, or some combination of thereof. In this regard, in some examples, the computer is configured to determine one or more adjustments automatically, that is, without being directly controlled by an operator. This may be accomplished using a number of suitable algorithms, such as machine learning algorithms trained to determine one or more adjustments. Additionally or alternatively, in some examples, the computer is configured to determine one or more adjustments under direct operator control. The computer may display one or more adjustments for an operator to implement. Additionally or alternatively, in some examples, the computer may be configured to send instructions to one or more of the machine tools 302 to implement one or more adjustments, automatically, under direct operator control, or some combination thereof.

In some examples, the computer 306 is configured to perform the analysis to produce the feedback data 310 including the summary 312 from which an outlier, trend or pattern in the data is identifiable, and identify an adjustment based on the outlier, trend or pattern, and according to which the process or one or more of the machine tools 302 is adjustable.

In some examples in which the first machine tool 302A and/or the second machine tool 302B experiences a fault during manufacture of the composite structure, the data includes the first measurement data, including measurements of a particular operating condition of the first machine tool and/or the second machine tool before the fault. In some of these examples, the computer 306 is configured to perform the analysis to summarize a change in the measurements of the particular operating condition before the fault. The first machine tool and/or the second machine tool that experienced the fault is repairable or replaceable, and the process is adjustable to further monitor the particular operating condition during manufacture of the next composite structure.

In some examples in which the data includes the error data, the error data includes a particular error repeatedly reported during manufacture of the composite structure, such as by the first machine tool 302A and/or the second machine tool 302B. In some of these examples, the computer 306 is configured to perform the analysis to summarize repetition of the particular error. The computer is further configured to perform a root cause analysis to identify a root cause of the repetition of the particular error. The first machine tool and/or the second machine tool, then, is adjustable to address the root cause. In an AFP machine, for example, repetition of certain error codes may be determined to be caused by a faulty A/C unit, which may be replaced to address the root cause. Repetition in other error codes may be caused by a tensioner redirect roller and compliant roller not spinning freely, which may be cleaned.

In some examples in which the data includes the second measurement data, the second measurement data includes measurements of a property of the composite structure spatially referenced to locations on the composite structure. In some of these examples, the computer 306 configured to perform the analysis further includes the computer configured to generate a three-dimensional (3D) model 318 of the composite structure with the particular measurements indicated on the 3D model at the locations to which the particular measurements are spatially referenced. Examples of suitable particular measurements include measurements of cure state of the composite structure referenced to locations on the composite structure, measurements of wrinkles or defects identified on the composite structure, measurements that are out of tolerance or non-conforming, and the like.

In some further examples in which the particular measurements include measurements of defects in the composite structure, the measurements are classified in a plurality of subclasses of defects. In some of these examples, the computer 306 configured to generate the 3D model includes the computer configured to generate a heat map 320 including the 3D model on which the subclasses of defects are indicated, spatially referenced to locations on the composite structure. Additionally or alternatively, in some examples in which the particular measurements include measurements that are out of tolerance or non-conforming, the computer is configured to generate the heat map or another heat map including the 3D model on which numbers of the measurements that are out of tolerance or non-conforming are indicated, spatially referenced to locations on the composite structure.

FIGS. 4A, 4B, 4C and 4C are flowcharts illustrating various operations in a method 400 according to example implementations of the present disclosure. As shown at block 402 of FIG. 4A, the method includes monitoring a process of manufacturing a composite structure, such as process 100, 200. The process includes introducing a matrix material to a reinforcement material, and applying 104 the reinforcement material into a mold cavity or onto a mold surface with a first machine tool 302A. The process includes subjecting the composite structure, including the reinforcement material and the matrix material, to a melding event with a second machine tool 302B, to set the composite structure. And the process includes inspecting 108 the composite structure to evaluate properties of the composite structure.

As shown at block 404, based on the monitoring, the method 400 includes determining 404 data comprising first measurement data, error data and/or second measurement data. The first measurement data is indicative of an operating condition of the first machine tool 302A and/or the second machine tool 302B, and the error data is indicative of an error associated with the first machine tool and/or the second machine tool, which may be recorded or reported by sensors or systems 304 of respectively the first machine tool and/or the second machine tool during manufacture of the composite structure. The second measurement data is indicative of a property of the composite structure, which may also be recorded or reported during manufacture of the composite structure.

The method 400 includes performing an analysis of the data to summarize the data and thereby produce feedback data 310 comprising a summary 312 of the data, as shown at block 406. The method includes adjusting the process, the first machine tool 302A and/or the second machine tool 302B based on the feedback data, as shown at block 408, and for manufacture of a next composite structure. And in some examples, the method includes manufacturing the next composite structure according to or using the process, the first machine tool or the second machine tool, as adjusted.

In some examples, the analysis is performed to produce the feedback data 310 comprising the summary 312 of the data from which an outlier, trend or pattern in the data is identifiable, as shown at block 406' of FIG. 4B. In some of these examples, adjusting the process, the first machine tool 302A and/or the second machine tool 302B includes identifying an adjustment based on the outlier, trend or pattern, and adjusting the process, the first machine tool and/or the second machine tool according to the adjustment, as shown at blocks 408A' and 408B'.

In some examples, when the first machine tool 302A or the second machine tool 302B experiences a fault during manufacture of the composite structure, the data includes the first measurement data, including measurements of a particular operating condition of the first machine tool and/or the second machine tool before the fault. In some of these examples, performing the analysis includes performing the analysis to summarize a change in the measurements of the particular operating condition before the fault, as shown at block 406" of FIG. 4C. Also in some of these examples, adjusting the process, the first machine tool and/or the second machine tool includes performing a repair or replacement of the first machine tool and/or the second machine tool that experienced the fault, and adjusting the process to further monitor the particular operating condition during manufacture of the next composite structure, as shown at blocks 408A" and 408B".

In some examples, the data includes the error data, including a particular error repeatedly reported during manufacture of the composite structure. In some of these examples, performing the analysis includes performing the analysis to summarize repetition of the particular error, as shown at block 406''' of FIG. 4D. Also in some of these examples, adjusting the process, the first machine tool and/or the second machine tool includes performing a root cause analysis to identify a root cause of the repetition of the particular error, and adjusting the first machine tool and/or the second machine tool to address the root cause, as shown at blocks 408A''' and 408B'''.

Returning to FIG. 4A, in some examples in which the data includes the second measurement data, the second measurement data includes particular measurements of a property of the composite structure spatially referenced to locations on the composite structure. In some of these examples, performing the analysis further includes generating a three-dimensional (3D) model 318 of the composite structure with the particular measurements indicated on the 3D model at the locations to which the particular measurements are spatially referenced, as shown at block 412. As indicated above, examples of suitable particular measurements include measurements of cure state of the composite structure referenced to locations on the composite structure, measurements of wrinkles or defects identified on the composite structure, measurements that are out of tolerance or non-conforming, and the like.

In some examples in which the particular measurements include measurements of defects in the composite structure, the measurements are classified in a plurality of subclasses of defects. In some of these examples, generating the 3D model 318 includes generating a heat map 320 including the 3D model on which the subclasses of defects are indicated, spatially referenced to locations on the composite structure, as shown at block 414. Additionally or alternatively, in some examples in which the particular measurements include measurements that are out of tolerance or non-conforming, generating the 3D model includes generating a heat map including the 3D model on which numbers of the measurements that are out of tolerance or non-conforming are indicated, spatially referenced to locations on the composite structure.

According to example implementations of the present disclosure, the computer 306 can be implemented or otherwise executed by various means. These means can include hardware, alone or under direction of one or more computer programs from a computer-readable storage medium. In some examples, more than one computer can be configured to function as or otherwise implement the computer shown and described herein.

FIG. 5 illustrates the computer 306 according to some example implementations of the present disclosure. Generally, the computer of example implementations of the present disclosure can comprise, include or be embodied in one or more fixed, portable or mobile electronic devices. The computer can include one or more of each of a number of components such as, for example, processing circuitry 502 (e.g., processor unit) connected to a memory 504 (e.g., storage device).

The processing circuitry 502 can be composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which can be packaged as an integrated circuit or multiple interconnected integrated circuits (an integrated circuit at times more commonly referred to as a "chip"). The processing circuitry can be configured to execute computer programs, which can be stored onboard the processing circuitry or otherwise stored in the memory 504 (of the same or another computer).

The processing circuitry 502 can be a number of processors, a multi-core processor or some other type of processor, depending on the particular implementation. Further, the processing circuitry can be implemented using a number of heterogeneous processor systems in which a main processor is present with one or more secondary processors on a single chip. As another illustrative example, the processing circuitry can be a symmetric multi-processor system containing multiple processors of the same type. In yet another example, the processing circuitry can be embodied as or otherwise include one or more ASICs, FPGAs or the like. Thus, although the processing circuitry can be capable of executing a computer program to perform one or more functions, the processing circuitry of various examples can be capable of performing one or more functions without the aid of a computer program. In either instance, the processing circuitry can be appropriately programmed to perform functions or operations according to example implementations of the present disclosure.

The memory 504 is generally any piece of computer hardware that is capable of storing information such as, for example, data, computer programs (e.g., computer-readable program code 506) and/or other suitable information either on a temporary basis and/or a permanent basis. The memory can include volatile and/or non-volatile memory, and can be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks can include compact disk-read only memory (CD-ROM), compact disk-read/write (CD-R/W), DVD or the like. In various instances, the memory can be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein can generally refer to a computer-readable storage medium or computer-readable transmission medium.

In addition to the memory 504, the processing circuitry 502 can also be connected to one or more interfaces for displaying, transmitting and/or receiving information. The interfaces can include communications interface(s) 508 (e.g., communications unit) and/or one or more user interfaces. The communications interface can be configured to transmit and/or receive information, such as to and/or from other computer(s), network(s) or the like. The communications interface can be configured to transmit and/or receive information by physical (wired) and/or wireless communications links. Examples of suitable communication interfaces include a network interface controller (NIC), wireless NIC (WNIC) or the like.

The user interfaces can include a display 510 and/or user input interface(s) 512 (e.g., input/output unit). The display can be configured to present or otherwise display information to a user, suitable examples of which include a liquid crystal display (LCD), light-emitting diode display (LED), plasma display panel (PDP) or the like. The user input interfaces can be wired or wireless, and can be configured to receive information from a user into the computer, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces can further include one or more interfaces for communicating with peripherals such as printers, scanners or the like.

As indicated above, program code instructions can be stored in memory, and executed by processing circuitry that is thereby programmed, to implement functions of the systems, subsystems, tools and their respective elements described herein. As will be appreciated, any suitable program code instructions can be loaded onto a computer or other programmable apparatus from a computer-readable storage medium to produce a particular machine, such that the particular machine becomes a means for implementing the functions specified herein. These program code instructions can also be stored in a computer-readable storage medium that can direct a computer, a processing circuitry or other programmable apparatus to function in a particular manner to thereby generate a particular machine or particular article of manufacture. The instructions stored in the computer-readable storage medium can produce an article of manufacture, where the article of manufacture becomes a means for implementing functions described herein. The program code instructions can be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions can be performed sequentially such that one instruction is retrieved, loaded and executed at a time. In some example implementations, retrieval, loading and/or execution can be performed in parallel such that multiple instructions are retrieved, loaded, and/or executed together. Execution of the program code instructions can produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, the computer 306 can include a processing circuitry 502 and a computer-readable storage medium or memory 504 coupled to the processing circuitry, where the processing circuitry is configured to execute computer-readable program code 506 stored in the memory. It will also be understood that one or more functions, and combinations of functions, can be implemented by special purpose hardware-based computer systems and/or processing circuitry s which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions can be provided by alternative implementations without departing from the scope of the appended claims. In this regard, for example, different combinations of elements and/or functions than those explicitly described above are also contemplated as can be set forth in some of the appended claims. Although specific terms are employed herein, they are used in a generic and descriptive sense only and not for purposes of limitation.

What is claimed is:

1. A method comprising:
monitoring a process of manufacturing a composite structure that comprises:
introducing a matrix material to a reinforcement material;
applying the reinforcement material into a mold cavity or onto a mold surface with a first machine tool;
subjecting the composite structure, including the reinforcement material and the matrix material, to a melding event with a second machine tool, to set the composite structure including the reinforcement material and the matrix material; and
inspecting the composite structure to evaluate properties of the composite structure; and based on the monitoring,
determining data comprising at least one of first measurement data indicative of an operating condition of at least one of the first machine tool or the second machine tool, error data indicative of an error associated with at least one of the first machine tool or the second machine tool, or second measurement data indicative of a property of the composite structure;
performing an analysis of the data to summarize the data and thereby produce feedback data comprising a summary of the data; and
adjusting at least one of the process, the first machine tool or the second machine tool based on the feedback data, and for manufacture of a next composite structure.

2. The method of claim 1, wherein performing the analysis comprises performing the analysis to produce the feedback data comprising the summary of the data from which an outlier, trend or pattern in the data is identifiable, and
wherein adjusting at least one of the process, the first machine tool or the second machine tool comprises identifying an adjustment based on the outlier, trend or pattern, and adjusting at least one of the process, the first machine tool or the second machine tool according to the adjustment.

3. The method of claim 1, wherein performing the analysis comprises automatically producing infographics in a graphical user interface (GUI) to visually summarize the data.

4. The method of claim 1, wherein when at least one of the first machine tool or the second machine tool experiences a fault during manufacture of the composite structure, the data comprises the first measurement data, including measurements of a particular operating condition of at least one of the first machine tool or the second machine tool before the fault,
wherein performing the analysis comprises performing the analysis to summarize a change in the measurements of the particular operating condition before the fault, and
wherein adjusting at least one of the process, the first machine tool or the second machine tool comprises performing a repair or replacement of at least one of the first machine tool or the second machine tool that experienced the fault, and adjusting the process to further monitor the particular operating condition during manufacture of the next composite structure.

5. The method of claim 1, wherein the data comprises the error data, including a particular error repeatedly reported during manufacture of the composite structure,
wherein performing the analysis comprises performing the analysis to summarize repetition of the particular error, and wherein adjusting at least one of the process, the first machine tool or the second machine tool comprises performing a root cause analysis to identify a root cause of the repetition of the particular error, and adjusting at least one of the first machine tool or the second machine tool to address the root cause.

6. The method of claim 1, wherein the data comprises the second measurement data, including particular measurements of a property of the composite structure spatially referenced to locations on the composite structure, and wherein performing the analysis further comprises generating a three-dimensional (3D) model of the composite structure with the particular measurements indicated on the 3D model at the locations to which the particular measurements are spatially referenced.

7. The method of claim 6, wherein the particular measurements include measurements of cure state of the composite structure referenced to locations on the composite structure.

8. The method of claim 6, wherein the particular measurements include measurements of wrinkles or defects identified on the composite structure.

9. The method of claim 8, wherein the particular measurements include measurements of defects in the composite structure, classified in a plurality of subclasses of defects, and wherein generating the 3D model comprises generating a heat map including the 3D model on which the subclasses of defects are indicated, spatially referenced to locations on the composite structure.

10. The method of claim 6, wherein the particular measurements include measurements that are out of tolerance or non-conforming, and wherein generating the 3D model comprises generating a heat map including the 3D model on which numbers of the measurements that are out of tolerance or non-conforming are indicated, spatially referenced to locations on the composite structure.

11. A computer comprising:

a memory configured to store computer-readable program code; and processing circuitry configured to access the memory, and execute the computer-readable program code to cause the computer to at least:

monitor a process of manufacturing a composite structure that comprises machine tools configured to at least:
introduce a matrix material to a reinforcement material;
apply the reinforcement material into a mold cavity or onto a mold surface with a first machine tool of the machine tools;
subject the composite structure, including the reinforcement material and the matrix material, to a melding event with a second machine tool of the machine tools, to set the composite structure; and
inspect the composite structure to evaluate properties of the composite structure; and based on the monitor, determine data comprising at least one of first measurement data indicative of an operating condition of at least one of the first machine tool or the second machine tool, error data indicative of an error associated with at least one of the first machine tool or the second machine tool, or second measurement data indicative of a property of the composite structure; and perform an analysis of the data to summarize the data and thereby produce feedback data comprising a summary of the data, wherein at least one of the process, the first machine tool or the second machine tool is adjustable based on the feedback data, and for manufacture of a next composite structure.

12. The computer of claim 11, wherein the computer caused to perform the analysis comprises the computer caused to perform the analysis to produce the feedback data comprising the summary of the data from which an outlier, trend or pattern in the data is identifiable, and identify an adjustment based on the outlier, trend or pattern, and wherein at least one of the process, the first machine tool or the second machine tool is adjustable according to the adjustment.

13. The computer of claim 11, wherein the computer caused to perform the analysis comprises the computer caused to automatically produce infographics in a graphical user interface (GUI) to visually summarize the data.

14. The computer of claim 11, wherein when at least one of the first machine tool or the second machine tool experiences a fault during manufacture of the composite structure, the data comprises the first measurement data, including measurements of a particular operating condition of at least one of the first machine tool or the second machine tool before the fault, wherein the computer caused to perform the analysis comprises the computer caused to perform the analysis to summarize a change in the measurements of the particular operating condition before the fault, and wherein at least one of the first machine tool or the second machine tool that experienced the fault is repairable or replaceable, and the process is adjustable to further monitor the particular operating condition during manufacture of the next composite structure.

15. The computer of claim 11, wherein the data comprises the error data, including a particular error repeatedly reported during manufacture of the composite structure, wherein the computer caused to perform the analysis comprises the computer caused to perform the analysis to summarize repetition of the particular error, and wherein the processing circuitry is configured to execute the computer-readable program code to cause the computer to further perform a root cause analysis to identify a root cause of the repetition of the particular error, and at least one of the first machine tool or the second machine tool is adjustable to address the root cause.

16. The computer of claim 11, wherein the data comprises the second measurement data, including particular measurements of a property of the composite structure spatially referenced to locations on the composite structure, and wherein the computer caused to perform the analysis further comprises the computer caused to generate a three-dimensional (3D) model of the composite structure with the particular measurements indicated on the 3D model at the locations to which the particular measurements are spatially referenced.

17. The computer of claim 16, wherein the particular measurements include measurements of cure state of the composite structure referenced to locations on the composite structure.

18. The computer of claim 16, wherein the particular measurements include measurements of wrinkles or defects identified on the composite structure.

19. The computer of claim 18, wherein the particular measurements include measurements of defects in the composite structure, classified in a plurality of subclasses of defects, and wherein the computer caused to generate the 3D model comprises the computer caused to generate a heat map including the 3D model on which the subclasses of defects are indicated, spatially referenced to locations on the composite structure.

20. The computer of claim 16, wherein the particular measurements include measurements that are out of tolerance or non-conforming, and wherein the computer caused to generate the 3D model comprises the computer caused to generate a heat map including the 3D model on which numbers of the measurements that are out of tolerance or non-conforming are indicated, spatially referenced to locations on the composite structure.

* * * * *